Dec. 16, 1969      R. L. IGNELL      3,484,518
METHOD OF AND APPARATUS FOR THE MANUFACTURE OF OBJECTS
FROM PLASTIC MATERIAL BY PRESSURE AND/OR
VACUUM FORMING OPERATIONS
Filed Oct. 31, 1966      3 Sheets-Sheet 1
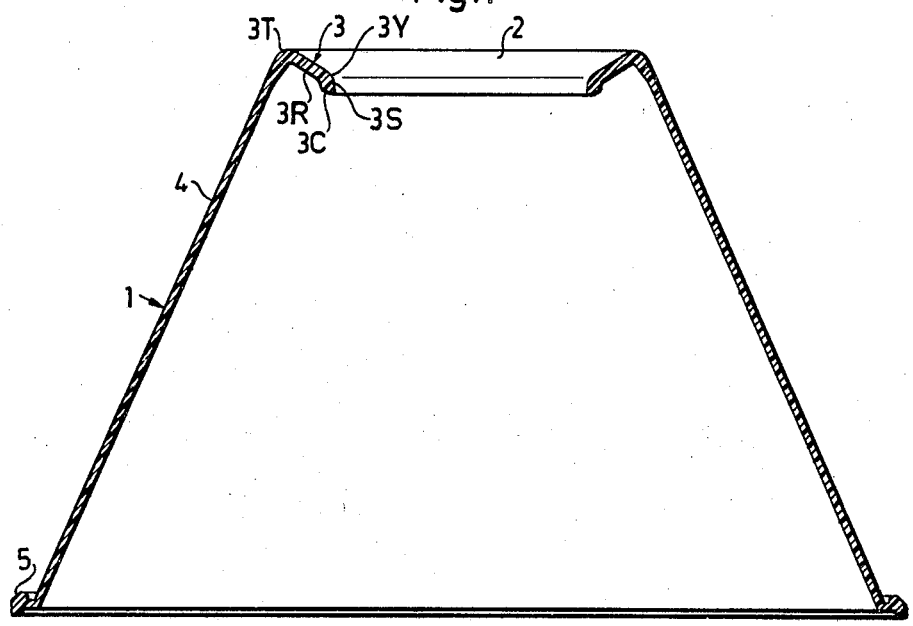
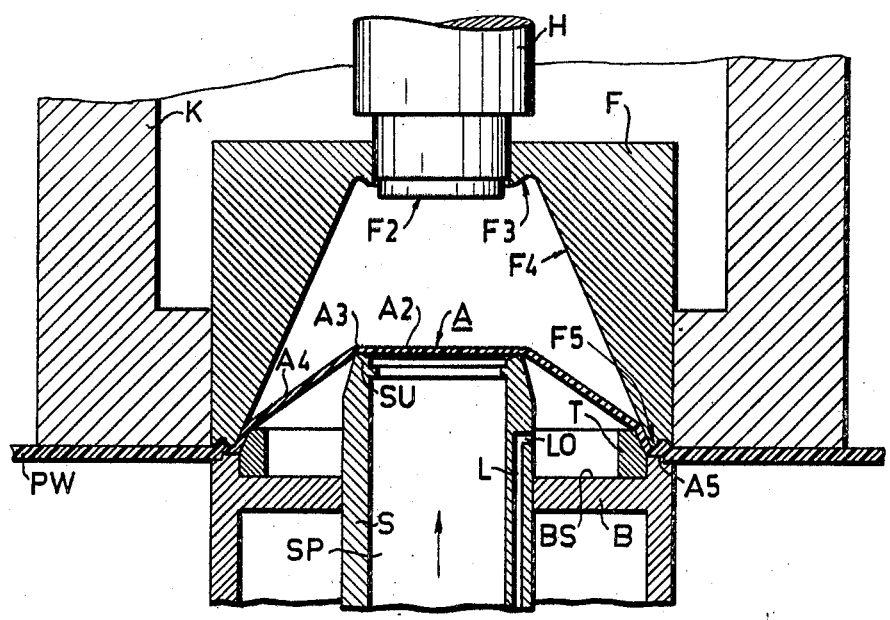

Dec. 16, 1969   R. L. IGNELL   3,484,518
METHOD OF AND APPARATUS FOR THE MANUFACTURE OF OBJECTS
FROM PLASTIC MATERIAL BY PRESSURE AND/OR
VACUUM FORMING OPERATIONS
Filed Oct. 31, 1966   3 Sheets-Sheet 2
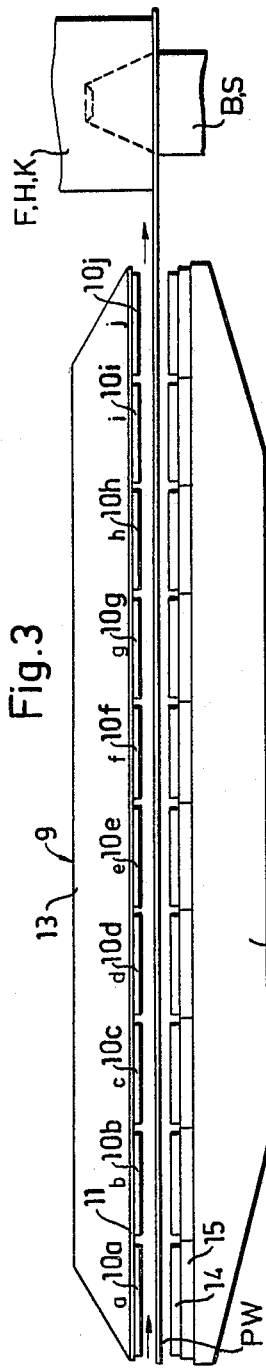
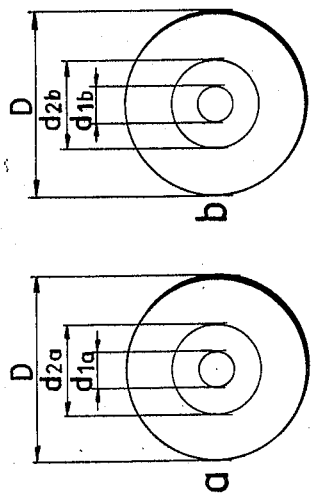
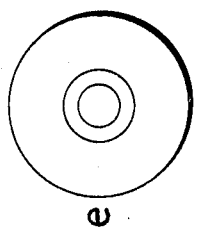
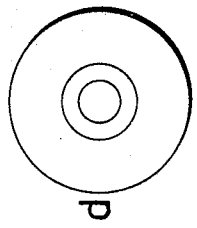
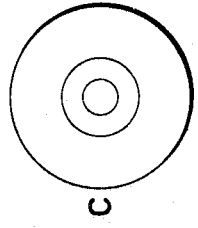
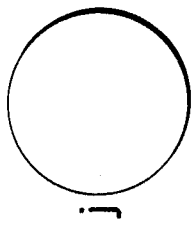
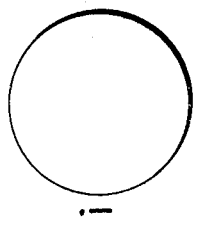
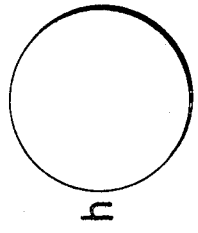
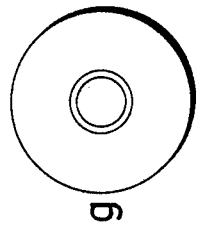
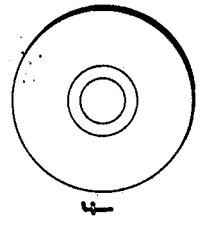

Dec. 16, 1969  R. L. IGNELL  3,484,518
METHOD OF AND APPARATUS FOR THE MANUFACTURE OF OBJECTS
FROM PLASTIC MATERIAL BY PRESSURE AND/OR
VACUUM FORMING OPERATIONS
Filed Oct. 31, 1966  3 Sheets-Sheet 3

INVENTOR

BY

ATTORNEY

United States Patent Office 3,484,518
Patented Dec. 16, 1969

3,484,518
METHOD OF AND APPARATUS FOR THE MANUFACTURE OF OBJECTS FROM PLASTIC MATERIAL BY PRESSURE AND/OR VACUUM FORMING OPERATIONS
Rolf Lennart Ignell, Lund, Sweden, assignor to Sobrefina SA, Fribourg, Switzerland, a Swiss company
Filed Oct. 31, 1966, Ser. No. 590,966
Claims priority, application Sweden, Nov. 9, 1965, 14,422/65
Int. Cl. B29c 17/04
U.S. Cl. 264—297                                    8 Claims

ABSTRACT OF THE DISCLOSURE

Method of and apparatus for the manufacture of objects from plastic material by pressure and/or vacuum forming operations wherein a web of plastic material is fed in a step-like manner past a pressing and/or vacuum forming station at which a portion of the web is formed into an object having the desired configuration. In order to better attain a desired distribution of the plastic material at the forming station, the web material is non-uniformly plasticised at specific zones within the overall area required for forming the object prior to presenting it to the forming station. This non-uniform plasticising may be accomplished by a series of preheating steps, or in the alternative by first uniform heating of the entire area of the web of plastic material followed by the selective cooling of different zones.

---

Figure 5:
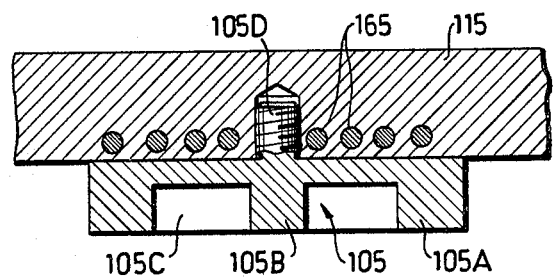

The present invention relates to a method of and apparatus for the manufacture of plastic objects by pressure and/or vacuum forming starting from a substantially flat, web-shaped thermoplastic material. Primarily the invention is intended to be applied to the packaging art and has been developed in connection with the production of a new special package in which great demands are made upon the strength characteristics and sealing capability of the package, said characteristics having to be combined with efficient consumption of material. At the same time, since the package is to have a substantial wall thickness in regions where the mechanical stresses are particularly powerful, such as in the region around the opening of the container, and in a sealing region, where the walls are to have a relatively complicated cross-section configuration and in which region two parts are intended to be welded together to form the finished container, the remaining regions are thus to have as little wall thickness as possible, in order that the consumption of material may be reduced. Furthermore, in the case of the present container, great demands are made upon its opening, the inner periphery of which must be completely smooth, in order that a cap pushed down into the opening may seal the container efficiently. Besides this, the forming of the package parts has to take place rapidly, which means fractions of a second.

Thus difficult adjustment problems have been encountered in determining the degree of plasticity of the preheated material, which could not be solved in a conventional way while at the same time maintaining the high operational speed and the desired configuration of the package. The demands and desires presented may, however, be satisfied by the method according to the invention which is characterized in that at least each region which is intended for the object to be produced is non-uniformly plasticized prior to its being advanced to a forming tool, so that within said region certain zones are more plasticized than other zones within the same region; that the plasticized region is advanced to a forming position to be formed by a forming tool; and that finally the said tool forms the objects utilizing the individual plasticity conditions of the zones for obtaining a desired distribution of the plastic material in the finished product.

For obtaining a successful result by the process it is also necessary to arrange the plasticized region with a great precision in the forming tool, so that each detail of the forming tool will be allotted a portion of the plastic material that owns a certain degree of plasticity. Thus, the slightest displacement of the plastic material relative to the forming tool may spoil the finished product.

It has proved to be very difficult according to techniques known in the art to move plasticized plastic webs without causing deformations in the material. The difficulties have been noticed e.g. in German Patent No. 1,191,549. The solution proposed in this patent includes the step of first preheating the entire material in a first heating station, whereupon the material is plasticized in a second station immediately prior to its being moved into the forming tool. The deformations of the materials are said hereby essentially to be reduced. The method, however, cannot be utilized for producing those plastic objects which are intended to be produced according to the present invention, since the precision of the method does not comply with the demands that are put forward. According to the present invention it is instead proposed to let at least a major portion of the plastic material outside that region which is intended for the object to be produced remain non-plasticized so that said portion in the shape of a lattice may be able to stiffen up the material, whereby the plasticized region can be advanced and introduced with a great precision in the desired forming position.

Preferably the plasticization is carried out in that the said region is brought into direct contact with a heater element, which supplies heating energy only to the said zones of the plastic material or supplies more heating energy to these zones than to the other portions of the said region. Also the opposite method of course is possible, i.e. first to plasticize the entire material and thereupon to bring the material into contact with a cooler which, within the region intended for the object to be produced, non-uniformly abducts heat from the plastic material.

Suitably the said region is given the desired degree of plasticity by a series of successive heating operations at heating stations provided therefor. Preferably, during each moment intended for heating, all the heater elements are in operation and supply heat to the respective regions of the web-shaped plastic material, while in the intervals between the heating moments a movement of the material corresponding to the distance between two stations is performed, so that gradually each region of the plastic web material intended for forming will be treated at all the stations. By this procedure there is obtained a number of advantages. On one hand the procedure can be involved in the way of operation of the machine including the forming tool in that one can utilize the short moments when the machine is at a stand still for the heating of the plastic material without having to give the heater elements a very high temperature, and on the other hand one can, due to the accumulated effect from the separate heater elements, receive a plasticized material the high- and low grade plasticized zones of which gradually converge into each other.

Figure 6:
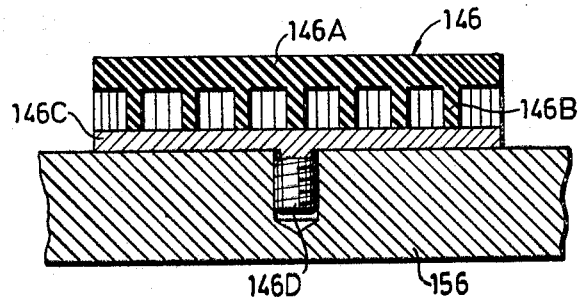
Figure 7:
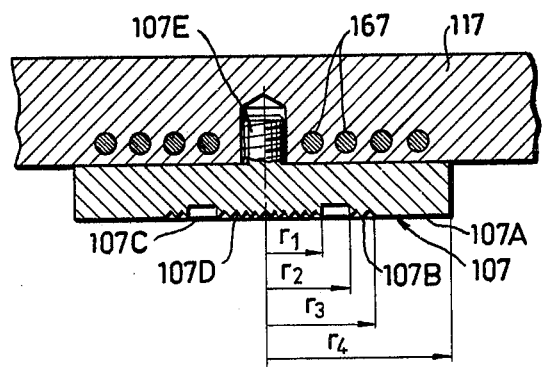

The invention will now be described with reference to the accompanying drawings, in which:

FIG. 1 is a section at a large scale through a part which has been produced by utilizing the principle of the invention, FIG. 2 illustrates a moment at the forming of the part shown in FIG. 1, FIG. 3 shows a diagrammatic lateral view of a plant in which the principles of the invention are utilized, FIG. 4 illustrates diagrammatically how a web material may be heated stepwise in the plant shown in FIG. 3, FIG. 5 is a section through a heating element, FIG. 6 is a section through a back-up member, and FIG. 7 is a section through an element according to an alternative embodiment.

The part 1 shown in FIG. 1 consists of the top part of a plastic bottle and has an opening 2 intended to form a pouring opening in the finished package, an inturned lip 3 defining the opening, a neck portion 4 and a bottom flange 5 which is intended to be welded together with a bottom part. As the package is intended to be used preferably for filling materials which develop an inner overpressure in the bottle, it is necessary, that the lip 3 is made relatively thick so as to be able to take up such stresses as may occur from a cap inserted into the opening. This holds true both in respect to the relatively straight portion 3R of the lip 3 which has a heavier wall thickness than the bottle neck portion 4, and in respect to the transition 3T between the bottle neck and the lip and, above all, the innermost portion 3C of the lip against which special sealing means on the said cap are to be pressed. Furthermore, the surface 3S of the lip 3 turned towards the axis of the package has to be very smooth in order that the required sealing may be provided, in addition to which the transition 3Y between the straight portion 3R of the lip 3 and the surface 3S must be made very soft so that the cap will not be damaged during the capping operation.

Also the lower flange 5 is formed in a special way which is necessitated by the requirement that the flange must be durably weldable to a lower portion of the package not shown. The various components, i.e. beads, channels, or the like, of which the flange 5 is constructed need not be explained more closely in respect to their function of construction, reference being made to FIG. 1 which illustrates these details.

In FIG. 2 it is diagrammatically shown how the bottle top 1 may be produced, only the essential means being shown in the figure, while other means have been omitted in order that the essential ones may be better seen. By PW is designated a web-like plastic material, for example polyvinylchloride, which has been plasticized by heating in a way to be described hereinafter. By A is further generally designated a circular portion of the web-like material PW, which portion A is disposed in a forming tool to be formed into the configuration shown in FIG. 1. At the moment of the forming process which is illustrated in FIG. 2, the portion A5 of the plastic piece A which is to form the flange 5 has substantially already been shaped, while the portion A4 which is to form the bottle neck 4 is being drawn. The lip 3 is to be formed substantially from the material A3, while the central portion A2 is to be removed when making the opening 2.

The outer configuration of the bottle top is determined by the forming tool F. The outer shape of the flange 5 is then determined substantially by recesses F5 in the lower part of the form F and the shape of the bottle neck by the inner surface F4 of the forming tool, while the outer shape of the lip 3 is determined by the surface F3. The opening 2 which corresponds to the surface F2 is produced by the stamp H. The stamp H is shown only diagrammatically in FIG. 2.

The forming operation is carried out by combined pressing and vacuum molding, in the present case, however, also pressure forming is employed. The term vacuum molding, includes both pressure from the material side and vacuum from the mold side. The compression molding tool which is designated by S has the shape of a tube which is slidably mounted in a tool B. The compression molding tool S has a compressed air pipe L with a mouth LO in its wall. The upper part SU of the compression molding tool S is formed so that at the end of the ascending movement of the tool S it shall be able by pressing to form the inner surface of the inturned lip 3. Among other details shown in FIG. 2 T designates an annular member intended during the forming process to fix the material quantity A5 in the molding space F5, and K designates a cut-off means movable in an axial direction.

The device shown in FIG. 2 operates in the following way. At the beginning of a forming operation the upper parts, i.e. the cutting ring K, the forming tool F and the stamp H, are in the position shown in FIG. 2. The lower parts, on the other hand, are moved slightly down, so that the web material PW including the portion A may be introduced into the desired position.

Before introducing the portion A, which is the starting material for the desired part 1, to be formed into the forming tool, it has been pre-heated and plasticized. According to the invention the portion A5 of the material has then been highly plasticized, so that at the pressing of the tool B against the forming body F the material will completely fill the space F5. So as to prevent the soft plastic mass during the continuous molding process from being drawn out from the space F5, the annular tool T presses against the lower portion of the forming body F and fixes the quantity of material A5 in its position.

Also the major part of the quantity of material A4, i.e. the portion of material which is to form the bottle neck 4, has also largely been highly plasticized. For the purpose of preventing too great flowing in the parts of the neck portion which will be adjacent the transition 3T between the neck 4 and the inturned lip 3, these parts adjacent the portion A3 have not, however, been plasticized to such a high extent as those nearer the periphery.

The zone of the plastic portion A which corresponds to the region A3 and the transition between the region A3 and A4 has been plasticized only slightly in relation to the rest of the material. The object thereof is that the compression molding tool may be able with its upper part SU to move the plastic material up towards the upper part of the form F, the first part of the movement being carried out without compressed air. It is of substantial importance that in the region of the engagement between the upper part SU of the tool S and the plastic material no substantial thinning of the latter occurs, since exactly these parts of the quantity of plastic are to form the inturned lip 3, the transition 3T and the stiffening ring 3C, on which parts the greatest demand on strength are made.

The remaining part A2, i.e. the part to be removed at the stamping of the opening 2, is plasticized to a relatively high extent, so that the stresses which take place during forming shall not occur at the expense of the inturned lip 3. Yet it is to be noted that the limits stated are not sharply defined but that instead a smooth transition between heavily and lightly plasticized portions is present. Thus, the transition between the portions A2 and A3 is what might be called "semi-plastic," that is show a degree of plasticity between the extremely plasticized quantity of plastic, such as A5, and the slightly plasticized one, such as A3. Thereby a possibility is created at the stamping by means of the stamp to create a very smooth transition 3Y.

At the initiation of the forming process the compression molding tool S is brought down in the tool B. The stamp H occupies the position shown in FIG. 2. The web-formed plastic material PW has been advanced one step after performing the next preceding work operation, so that a circular piece of material A has been disposed in the desired way in the forming tool. The piece of material A is preheated according to the desires stated above, which is accomplished in a way which will be described hereinafter. The forming operation is thereupon initiated by moving the compression molding tool S in the upward direction and takes with it the plastic material A. The tool B locks the material at F5 without stamping through completely against the cut-off ring K. To get the full thickness of the starting material against the surface F3 the plastic is only relatively slightly plasticized in the region of the contact with the tool.

The air above the plastic piece A is evacuated through small passages not shown in the forming body F. The plastic foil A is then caused to engage the inner surfaces F2, F3 and F4 of the forming body F tightly, which in the case of F3 is brought about by the pressing tool S and in the case of F4 is brought about by the compressed air supplied at the final stage of the forming operation. Thereupon the form part F is moved upwards against spring pressure not shown, the opening in the package part being established, on the one hand, and the forming of the still relatively soft lip part being completed, on the other hand. The portion of plastic material A2 stamped off at the establishment of the hole 2 is removed through the passage SP in the pressing tool S. At the same time the finished part is separated from the web material PW by the tool B accompanying the form part F in its movement upwards, whereupon the forming tools are moved apart and the product formed is removed or carried along for continuous treatment.

Forming apparatus of the type referred to hereinabove is described in further detail in my co-pending U.S. patent application, Ser. No. 593,341, filed Nov. 10, 1966.

In FIG. 3 is diagrammatically shown a plant for carrying out the invention according to a preferred form thereof. A heating device 9 consists substantially of an upper part 13 including a plurality of heater elements 10, and a lower part 12 which according to the preferred form is not provided with heater elements, which, however, does not exclude the possibility that heater elements may be provided also in this part. The web-formed plastic material has as before been designated by PW and is advanced stepwise in the direction of the arrows through the heating device 9, the length of each step corresponding to the pitch of the heater elements 10. The frequency of stepwise movement is identical with the frequency of operation of the forming tools. This means that when a part is being formed—the forming tools are shown diagrammatically in FIG. 3—the whole of the plastic web is stationary, each heater element 10 subjecting the plastic material PW to heating in a way individual to the heater element involved within a circular region A, of the web material PW.

According to the preferred embodiment the heating device 9 is provided with ten heater elements 10, which have been designated 10a–10j. Each heater element is to be regarded as a treatment station, the stations generally having been designated a–j in a corresponding way. The elements 10 are screwed on to an aluminium plate 11 through which are connected electric conduits which supply the power necessary for the heating to the elements 10.

To illustrate how the elements are intended to be heated FIG. 4 is referred to. In this figure ten round or circular figures are thus shown which have been designated a–j, each round figure being intended to refer to a station or heater element 10. The rounds a–j in FIG. 4 may also be regarded as the heater elements 10a–j as seen from the bottom.

Considering the circle a in FIG. 4, which is intended to illustrate the temperature condition at the surface of the heater element 10a, it consists of three zones. The innermost zone, which has the form of a small circle having the diameter $d_{1a}$ is thus heated to a certain relatively high temperature which is common to all the heated element zones according to this embodiment of the invention. The annular zone outside the inner circle which zone has an outer diameter $d_{2a}$ is substantially not supplied with any heat power, i.e. this zone is not heated but is, in the following, called a cool zone. Outside this cool zone there is a further annular hot zone, the outer diameter D of which equals the diameter of the material piece A.

In the next heater element 10b the inner hot circle with the diameter $d_{1b}$ is slightly larger than the corresponding circle with the diameter $d_{1a}$ in the previous element. On the other hand, the diameter $d_{2b}$ is slightly less. In the next circle, the circle c, the inner circle has been slightly increased still further and the outer diameter of the annular cool zone slightly reduced. In this way the cool zone is gradually reduced at circles of f and g so as finally to disappear completely. The last three elements 10h–10j are thus homogeneously heated to the preferred temperature.

A piece A of the web-formed plastic material PW which is to be plasticized is gradually subjected to heating by all the heater elements 10a–10j, which at each heating moment, by lifting the lower part 12 of the heating device 9, are brought to engage the material to be plasticized. At each station a–j the plastic blank is heat treated during a time interval substantially corresponding to the time the forming of each part will take. In the present case this time is 0.75 sec. The number of stations or heater elements is ten. The total effective heat treatment time will thus be substantially 7.5 secs. Due to each heater element being formed in an individual manner, the hot and cool zones having been chosen in a way suitable for the purpose with regard to the demands made, which have been set forth earlier, the final result will be a blank which by the accumulation of the heat supply will present smoothly merging zones of varying degree of plasticity, each zone being plasticized to an extent suitable for the purpose. Those portions, on the other hand, outside the regions A are substantially not at all plasticized, whereby these portions will create a lattice-shaped region which stiffens up the web. The lattice might be said to define a conveyer by which the plasticized regions A are transported between the different heating stations and advanced to the forming tool. Thanks to the stiffening lattice, the movements can be carried out with a great precision, which is of greatest importance. One further advantage is that the inevitable wastage, which consists of the said lattice-shaped stiff portion, can easily be removed.

In the embodiment described with reference to the drawings the desired result has been obtained in that certain portions A have been plasticized, while the other portions of the web-shaped starting material have not been treated. Of course it is also possible instead first to plasticize the entire web and thereupon cool the portions corresponding to the above mentioned lattice. Different kinds of masking means provided to protect the regions outside the regions A from being heated of course also are thinkable.

To accomplish a zone-wise distribution of the heat power to the plastic material from a heater element, a number of different solutions may be conceived. Thus, it is possible, for example, to heat various portions of the element to different temperatures or in any desired manner by thermal insulators to reduce the heat radiation from certain "cool" zones.

FIG. 5 shows a section through a heater element 105, consisting of a circular piece of metal which has been turned to present a deep annular groove 105C. At both sides of this groove there is an outer annular land 105A and a central circular boss 105B. The element has a threaded pin 105D by which it is screwed into an aluminimum plate 115. In the aluminium plate there are embedded electrical leads 165 which supply the necessary power for heating the element 105. In the heating operation, the plastic material is pressed by means of a back-up member against the portions 105A and 105B. Within the contact regions the plastic will be slightly heated during the time the contact exists, which in the present case is about 0.75 sec. After this treatment the back-up is removed, the plastic accompanies it down some distance and is thereupon advanced to the next element, for example the element at the station b in FIGS. 3 and 4, where heating in a slightly larger region takes place.

Gradually, in spite of the boundaries between hot and cool zones in each element being sharply pronounced, each portion intended for forming will be heated and plasticized in a desired manner, greatly and slightly plasticized portions successively merging into each other without marked boundaries.

FIG. 6 shows a back-up member 146 intended to press the plastic material against the heater element. The back-up 146 consists, according to the embodiment shown, of an upper plate 146A of silicon rubber and of a great number of rods 146B manufactured integrally with the upper plate. The silicon rubber rods 146B are vulcanized to a fastening plate 146C, which in turn is screwed by means of a threaded pin 146D into a support 156. Due to the good elasticity properties of the back-up, the pressing of the plastic material against the heater element, for example the heater element 105 shown in FIG. 5, will occur very uniformly, whereby all contact portions will be equally heated.

In FIG. 7 an alternative embodiment of the heater element is shown, namely an element which has been utilized at the development of the present invention. In this element the metal surface within an inner, minor circle 107D with the radius $r_1$ is serrated in a way which is apparent from the figure. The heat conductivity from this portion thereby becomes relatively good. Outside this circle there is provided a "cool zone," the circular ring 107C with the outer radius $r_2$, by means of the material in the element surface in this zone being cut down so as to form a groove of a certain depth. The heat conductivity from this zone, which substantially corresponds to the region A3 of the plastic part A, will thereby be reduced in a desired manner. Outside this cool zone there is a further zone of average heat conductivity, the serrated circular ring 107B with the outer radius $r_3$, and finally the outermost circular ring 107A with the outer radius $r_4$ is untreated, so that for the purpose of creating a hot zone its heat conductivity is not reduced.

It will be understood, however, that the invention is not limited to the embodiments shown but may be varied in a number of ways, for example by modifying the heater elements or by, instead of supplying heat of a relatively moderate temperature, plasticizing the material strongly and thereupon causing a cooling action adapted for the purpose within certain regions. It is also possible according to an alternative embodiment to cut grooves in a plate of a poorly heat conducting material, the grooves being turned towards a heater plate of metal. Also the back-ups may be varied in a number of ways. Thus, for example, it is possible instead of silicon rubber rods, as in FIG. 6, to use a sponge rubber piece as a resilient element.

Obviously, it is also possible to provide a plurality of series of treatment stations in parallel, the heater elements and the forming tools being placed so that the plastic material may be utilized in the best way.

I claim:
1. In a method of successively forming plastic objects from a web of thermoplastic material, the steps comprising variably plasticising at a series of consecutive heat exchange stations and in a non-uniform manner, each region along said web allocated to each object to be formed so that certain zones of each region are plasticised more than others, each of said consecutive heat exchange stations producing sharp temperature variations between adjacent zones and successive heat exchange stations producing sharp temperature variations between adjacent zones which are spacially displaced from the zones of previous heat exchange stations whereby the temperature of one zone of a region gradually merges into the temperature of an adjacent zone of said region, advancing said variably plasticized regions consecutively to a forming station, and forming said objects from said regions, the variably plasticised zones of each region serving to bring about the desired distribution of the thermoplastic material of each region in the formed object.

2. A method as claimed in claim 1, in which the steps of variably plasticising each region along said web of thermoplastic material is carried out by heating the zones of said regions of said web at each of the consecutive heat exchange stations to form regions variably plasticised in a non-uniform manner.

3. A method as claimed in claim 2 wherein the heating of a plurality of consecutive regions at the consecutive heat exchange stations is carried out simultaneously, said regions being advanced step by step from one station to the succeeding station so that each region will have been variably treated to a predetermined degree prior to formation of the objects therefrom.

4. A method as claimed in claim 1 in which the steps of variably plasticising each region along said web of thermoplastic material is carried out by initially uniformly heating an increment of the entire web and thereafter, at the succeeding stations variably cooling the zones of said heated region to form regions variably plasticized in a non-uniform manner.

5. A method as claimed in claim 4 wherein the cooling of a plurality of consecutive regions at the consecutive heat exchange stations is carried out simultaneously, said regions being advanced step by step from one station to the succeeding station so that each region will have been variably cooled to a predetermined degree prior to formation of the objects therefrom.

6. In apparatus for successively forming plastic objects from a series of regions of a web of a thermoplastic material, the improvement comprising a series of consecutive heat exchange stations, heat exchange means at each station for variably plasticising, in a non-uniform manner, each region along said web allocated to each object to be formed so that certain zones of each region are plasticised more than others, each of said heat exchange means producing sharp temperature variations between adjacent zones of each region and successive heat exchange means producing sharp temperature variations between adjacent zones which are spacially displaced from the zones treated by the previous heat exchange means, whereby the temperature of one zone of a region gradually merges into the temperature of an adjacent zone of said region, means for advancing said web intermittently past said heat exchange means and means for forming objects from the region of said variably plasticised web.

7. In apparatus as claimed in claim 6 wherein the heat exchange means comprises heating means.

8. In apparatus as claimed in claim 6 and further comprising means for initially and uniformly heating an increment of the web and wherein the heat exchange means comprises cooling means.

References Cited

UNITED STATES PATENTS

| | | | |
|---|---|---|---|
| 3,256,564 | 6/1966 | Welshon | 264—92 X |
| 3,331,908 | 7/1967 | Shelby | 264—322 |
| 3,394,208 | 7/1968 | Lovas | 264—92 |

FOREIGN PATENTS

| | | |
|---|---|---|
| 751,068 | 6/1956 | Great Britain. |

ROBERT F. WHITE, Primary Examiner

A. M. SOKALAS, Assistant Examiner

U.S. Cl. X.R.

18—19; 264—322, 327